July 14, 1925.  1,545,538

S. H. WATKINS

LUBRICATING PITMAN

Filed April 14, 1925

Inventor
S. H. Watkins
By Clarence A. O'Brien
Attorney

Patented July 14, 1925.

1,545,538

UNITED STATES PATENT OFFICE.

SPURGEON H. WATKINS, OF SCOTT CITY, KANSAS.

LUBRICATING PITMAN.

Application filed April 14, 1925. Serial No. 23,032.

*To all whom it may concern:*

Be it known that I, SPURGEON H. WATKINS, a citizen of the United States, residing at Scott City, in the county of Scott and State of Kansas, have invented certain new and useful Improvements in Lubricating Pitmen, of which the following is a specification.

This invention relates to an improved pitman, which is adjustable and self oiling.

The improved pitman is capable of general use on various kinds of machines, the same, in the present instance, being used in association with a sickle bar, and an operating crank therefor.

The feature of the invention, as briefly intimated, is the provision of novel means, which, through the reciprocatory motion of the pitman, serves to automatically apply a lubricant to the bearings at the opposite ends thereof for continuously lubricating the journals therein.

The specific details employed for carrying the inventive conception into effect, will become readily apparent from the following description and drawings.

In the accompanying drawings, forming a part of this application, and in which like numerals are employed to designate like parts throughout the same:

Figure 1:
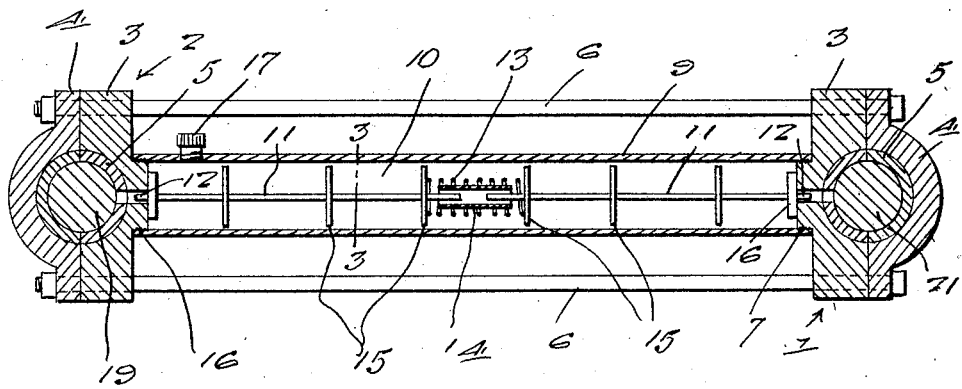
Figure 1 is a central longitudinal section, through a pitman rod, constructed in accordance with the present invention.

Referring to the drawings in detail, the reference character 1 designates a bearing at one end, and the reference character 2 the bearing at the opposite end. Each bearing is composed of duplicate half sections 3 and 4, shaped to accommodate the babbitt lining 5. In practice, shims (not shown) will be interposed between the sections and halves of the lining, so that wear may be compensated for. In this connection, it will be noted that elongated bolts 6 are connected with the sections of the two bearings, and upon removing shims, wear can be taken up in the usual way.

As before indicated, the prime novelty of the present invention is the automatic lubricating means for the bearing. In this connection, it will be observed that the inner section 3 of each bearing is provided with a central bored nipple 7, and that the bore registers with an opening, in the adjacent half of the bearing lining, thus providing oil ports for the bearings. An open ended cylinder 9, internally screw threaded, at its opposite ends, is connected with these nipples, and forms an internal lubricant chamber 10. Disposed within this chamber is a pair of duplicate plungers 11, the inner ends of which are spaced apart, and the outer ends 12 of which are extended into the oil ports, in the bearings at the opposite ends of the device. Surrounding the spaced inner ends of the plungers is an open ended sleeve 14, and surrounding this sleeve is a coiled spring 13, this spring bearing against the adjacent discs 15, which are arranged at longitudinally spaced points upon the plungers. It is therefore, obvious that the spring pressure exerted against the disc will serve to normally force the valve forming discs 16 against the seats provided by the ends of the aforesaid nipples 7. Hence, the ports here seen are normally closed by the valve. Attention, however, is directed to the fact that the spring 13 is not a very strong spring, being sufficient to maintain the valve closed, but also being sufficiently resilient to permit the valves to open and close intermittently, under the vibratory action given the plungers by the bodily movement of the pitman rod, when in operation. The plungers literally shake and the oil between the discs is gradually fed toward the ported bearings, and as soon as the valves open, oil is supplied to these bearings. It should be observed that the provision of the longitudinally spaced discs, divides the lubricant into relatively small quantities, so that there will be no violent flow, to permit flooding of the bearings. It is yet to be pointed out that a suitable filler plug 17 is tapped into a screw threaded hole in one end of the cylinder 9, to permit the lubricant to be placed into the latter. It will also be observed that the discs are of a diameter to permit the cylinder to be filled, substantially from end to end.

Figure 2:
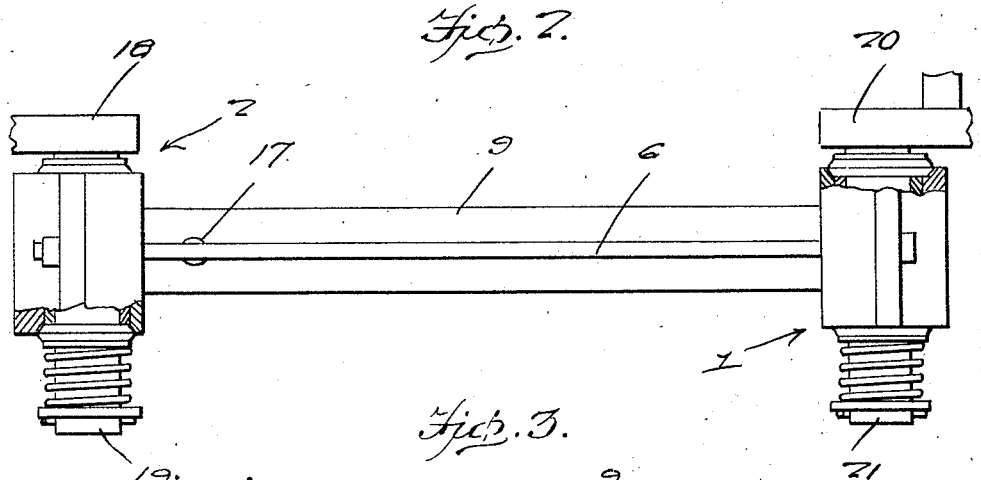
Figure 2 is a top plan view, with portions broken away and shown in section, and showing portions of a sickle bar and operating crank in association with the bearings at the opposite ends.
Figure 3:
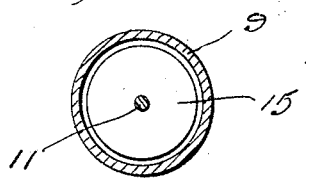
Figure 3 is a cross section, on the line 3—3 of Figure 1.

In Figure 2 a sickle bar 18 having a journal 19 is shown associated with the bearing 2, and an operating crank 20 having a spring pressed journal pin 21, is shown, associated with the bearing 1. The pitman rod, however, may be connected with other machine elements.

It is thought that persons, familiar with devices of this class will, upon carefully considering the description, in connection with the drawing, obtain a clear understanding of the invention. For this reason, a more lengthy description is deemed unnecessary.

While the preferred embodiment of the invention has been shown and described, it is to be understood that minor changes coming within the field of invention claimed may be resorted to, if desired.

I claim:

1. In a connecting rod of the kind described, an open ended cylinder adapted to receive a lubricant, ported bearings at the opposite ends of said cylinder, spring pressed plungers arranged in said cylinder, discs on said plungers at longitudinally spaced points, the outer end of each plunger extending into an adjacent co-operating port in said bearing, and said end being equipped with a valve for normally closing said port.

2. In a pitman construction, an open ended cylinder, ported bearings at the opposite ends of said cylinder, a pair of plungers disposed in said cylinder and provided at their outer ends with valves cooperable with the ports in said bearings, a sleeve surrounding the inner opposed ends of said plungers, said plungers being provided with longitudinally spaced discs, and a coil spring surrounding said sleeve and bearing at its opposite ends against adjacent discs.

In testimony whereof I affix my signature.

SPURGEON H. WATKINS.